(No Model.)

R. RASMUSSEN.
ROTARY ENGINE.

No. 338,778. Patented Mar. 30, 1886.

Witnesses:
Chas. E. Gaylord
Julius W. Dyrenforth

Inventor:
Rasmus Rasmussen,
By Dyrenforth & Dyrenforth,
Attys.

UNITED STATES PATENT OFFICE.

RASMUS RASMUSSEN, OF CHICAGO, ILLINOIS.

ROTARY ENGINE.

SPECIFICATION forming part of Letters Patent No. 338,778, dated March 30, 1886.

Application filed January 18, 1886. Serial No. 188,946. (No model.)

*To all whom it may concern:*

Be it known that I, RASMUS RASMUSSEN, a citizen of the United States, residing at Chicago, in the county of Cook and State of Illinois, have invented certain new and useful Improvements in Rotary Engines; and I hereby declare the following to be a full, clear, and exact description of the same.

It is my object to provide a rotary engine of very simple construction, to be operated preferably by steam, which actuates the wheel from which power is transmitted.

To this end my invention consists in a rotatory toothed wheel, and a chamber communicating with the source of power and to inclose a continually-changing peripheral portion of the wheel during its rotation, and rendered a close chamber by the inclosed portion of the wheel.

My invention also consists in a toothed wheel supported on journals, and a chamber to inclose a continually-changing segmental portion of the wheel during its rotation, and rendered a close chamber by such inclosed portion, and communicating with a source of power by means of a conduit having an oblique opening, the forward extremity of which opening forms a tangent, or nearly a tangent, to a tooth of the wheel in contact with it, and the rear extremity of which is in contact with a tooth at the end of a segment between the first-named point and a radius preferably forty-five degrees or less from the said first-named point; and my invention further consists in certain details of construction and combinations of parts, all as hereinafter more fully set forth.

Figure 1:
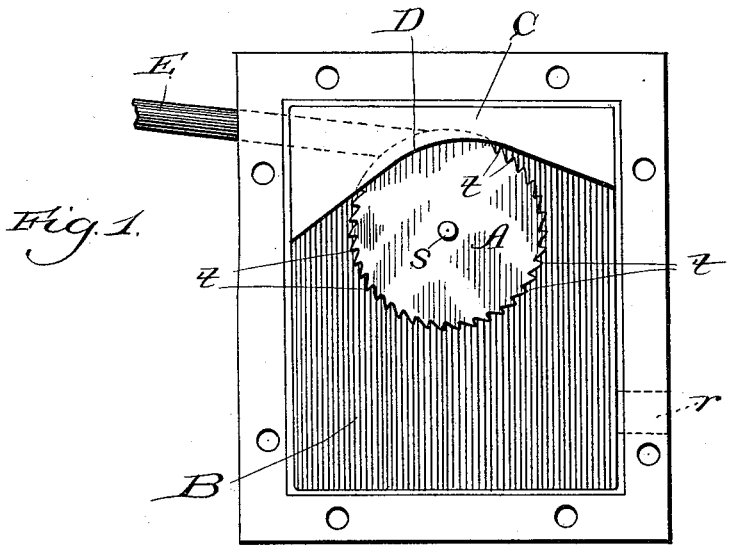
Figure 2:
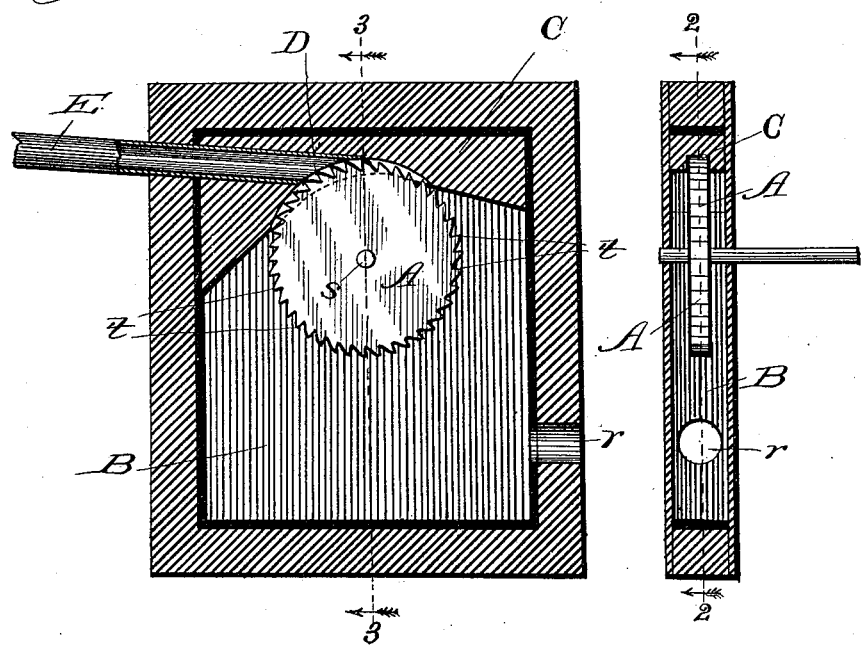

Referring to the drawings, Figure 1 shows my device within a vertical shallow case, having its cover removed, and in the opposite sides of which the wheel is supported upon its journals. Fig. 2 is a sectional view taken on the line 2 2 of Fig. 3, and Fig. 3 a transverse section on the line 3 3 of Fig. 2.

A is a wheel provided with teeth *t*, preferably inclined, as shown, toward the power-inlet and supported on a central shaft, *s*, journaled in the sides of an inclosing case, B, as shown, when the latter is used, and which case is provided with an exhaust-outlet, *r*.

C is a curved recessed block secured in the case B toward the upper end of the same, and having the recess in its under side tapering toward its extremities to produce the greatest depth at a point in vertical line with the center of the wheel, whereby the tooth at that point on the periphery will be in contact with the base of the recess, which is of a width to afford a snug fit of the wheel in its rotation. An oblique opening, D, leads tangentially, or nearly so, at its forward extremity from the recess in the block C, at the highest point of the same, where it is in contact with a tooth of the wheel, and the rear extremity of the opening leads from the recess at a point preferably about forty-five degrees from the said highest point, and where, also, it is in contact with a tooth, *t*. A conduit, E, affords communication between the chamber thus formed by the periphery of the wheel, two teeth, *t*, and the sides of the recess with the source of power, preferably steam, the introduction of which drives the wheel with the greatest possible force, owing to the particular manner of its application.

Experiment has shown that any change of the position of the forward extremity of the opening D with relation to that of the rear extremity of the same deteriorates and even prevents the operation, since it decreases the force by changing the leverage upon the wheel. It is of course obvious that the parts of the periphery of the wheel at which the driving-power is introduced against the same is immaterial, so long as the relative dimensions and combinations hereinbefore stated are observed. The same result would also be attained if the entire close chamber were produced by means of the sides of the recess, a segment of the periphery of the wheel, and the teeth at the opposite extremities of the segment in contact with the opposite edges of the oblique inlet-opening.

I do not claim, broadly, a rotary engine comprising a toothed wheel, or practically a toothed wheel which is rotated by impelling the driving-power against the teeth. Such a contrivance is known to me in several forms, one being designed to be operated by creating, by means of an injector, a vacuum within the case containing the wheel provided with buckets, whereby water rushes in to fill the vacuum, and is consequently impelled in a jet against the buckets and produces the revolution of the wheel; another, consisting of a toothed wheel caused to revolve within a chamber by the action of an injector to draw and impel water against the teeth or blades of the wheel, and the third, being an English device, operated by causing steam or other elastic fluid to act against vanes, boxes, or other similar contrivances attached to or forming parts of a wheel mounted to permit its rotation.

What I claim as new, and desire to secure by Letters Patent, is—

1. A rotary engine comprising, in combination, a rotatory toothed wheel, and a chamber communicating with the source of power and to inclose a continually-changing portion of the wheel toward the periphery of the latter during its rotation, and rendered a close chamber by such inclosed portion, substantially as described.

2. A rotary engine comprising, in combination, a rotatory toothed wheel, and a chamber communicating with the source of power by means of an oblique opening and to inclose a continually-changing portion of the wheel toward the periphery of the latter during its rotation, and rendered a close chamber by such inclosed portion, substantially as described.

3. A rotary engine comprising, in combination, a toothed wheel supported on journals, a chamber to inclose a continually-changing segmental portion of the wheel during its rotation, and rendered a close chamber by such inclosed portion, and communicating with a source of power by means of a conduit having an oblique opening, the forward extremity of which opening forms a tangent, or nearly a tangent, to a tooth of the wheel in contact with it, and the rear extremity of which is in contact with a tooth at the end of a segment between the first-named point and a radius preferably forty-five degrees or less from the said first-named point, substantially as described.

4. A rotary engine comprising, in combination, a wheel, A, provided with teeth $t$ and supported on a central shaft, $s$, a block, C, recessed on its under side to receive a portion of the periphery of the wheel, and a conduit, E, leading from an oblique opening in the recess of the block C, the whole being constructed and arranged to operate substantially as described.

5. A rotary engine comprising, in combination, a case, B, having an exhaust-opening, $r$, a wheel, A, provided with teeth $t$ and supported on a central shaft, $s$, within the case B, a block, C, within the case, recessed on its under side to receive a portion of the periphery of the wheel, and a conduit, E, leading from an oblique opening in the recess of the block C, the whole being constructed and arranged to operate substantially as described.

RASMUS RASMUSSEN.

In presence of—
JULIUS W. DYRENFORTH,
WM. SADLER.